June 29, 1965  D. A. HUNT  3,191,792
MEMBRANE DOUBLE WALL INTERCONNECTED PRESSURE VESSEL
Filed Oct. 11, 1962

INVENTOR.
David A. Hunt
BY

United States Patent Office 3,191,792
Patented June 29, 1965

3,191,792
MEMBRANE DOUBLE WALL INTERCONNECTED PRESSURE VESSEL
David A. Hunt, Hawthorne, Calif., assignor to the United States of America as represented by the United States Atomic Energy Commission
Filed Oct. 11, 1962, Ser. No. 230,013
2 Claims. (Cl. 220—3)

The present invention relates to pressure vessels and, more particularly, to a double wall interconnected pressure vessel of a special type.

Modern designers of pressure vessels are increasingly faced with situations wherein a vessel must be designed which will contain a system in which such large amounts of energy are liberated that cooling on only the inside surface of the vessel wall is inadequate. A double walled vessel in which a coolant is passed between the walls may be utilized to carry off the excess heat. When the pressure of such coolant is higher than the pressure within the vessel a net pressure acts radially inward on the inner wall. This situation may arise, for example, when designing vessels to contain large nuclear rocket engines. In such a case the normally desirable minimum vessel weight becomes an overriding consideration. Of course the vessel must be of the utmost reliability. Ease of fabrication is also a consideration, but clearly, considerations of weight and reliability are much more important.

The present invention overcomes the abovementioned problems. Its chief advantage lies in the fact that the configuration of the wall is such that bending stresses are completely eliminated for a fixed ratio of pressures, and are drastically reduced for a range of such ratios. Elimination of bending stresses makes it possible to use minimum wall thicknesses, thereby reducing the total weight of the pressure vessel to a minimum.

In accordance with the present invention a pressure vessel, of the type requiring a double wall for internal cooling, is provided which comprises an inner wall, an outer wall and a multiplicity of radial ribs connecting said walls at uniform intervals so as to define a multiplicity of longitudinal coolant channels of identical cross section. The outer wall consists of a plurality of annular segments of a certain radius $r_1$, each annular segment being joined at its ends to adjacent segments and extending symmetrically between said ribs with its concave surface facing inwardly. The inner wall is similarly shaped but its concave surface faces outwardly. The specific dimensions of the various elements are governed by a formula which is derived below. The use of this formula in determining the vessel parameters will minimize the bending stresses in the structure.

Accordingly it is an object of the present invention to provide a pressure vessel design which is suitable for containing systems in which large amounts of energy are released.

It is another object of this invention to provide a double wall interconnected pressure vessel of such a configuration as to eliminate bending stresses and thereby minimize vessel weight.

It is a further object to provide a double wall interconnected pressure vessel of particular utility when the coolant pressure is greater between the walls than that inside the inner wall.

Other objects and advantages will be apparent to one skilled in the art from the following detailed description and drawings.

It can be proved that a nonconnected wall configuration is heavier than the interconnected wall configuration. Assume a cylindrical cross-section wherein R is the radius of the inner wall, $d$ is the distance between the inner and outer wall, $p_1$ is the pressure between the walls and $p_2$ is the pressure inside the inner shell. If $p_1 > p_2$ then for the nonconnected wall configuration, the membrane forces in the inner and outer cylinders are respectively $$P_2 = (p_1 - p_2)R \text{ and } P_1 = p_1(R+d)$$

for the interconnected wall configuration, the total membrane force taken by the walls is $$P = p_2 R + p_1 d$$

Assuming the alowable stress, $\sigma$ of the walls is constant for each wall and equal for each configuration, the total thickness for each configuration may be compared by utilizing the widely used formula:

$$\text{Stress} = \sigma = \frac{pr}{h}$$

where $h$ is the wall thickness. The total thickness for the nonconnected configuration is, $$\frac{P_1}{\sigma} + \frac{P_2}{\sigma} = \frac{p_1(R+d)}{\sigma} + \frac{(p_1 - p_2)R}{\sigma}$$

and for the interconnected walls the total thickness is $$\frac{P}{\sigma} = \frac{p_2 R + p_1 d}{\sigma}$$

then $$\frac{P_1}{\sigma} + \frac{P_2}{\sigma} - \frac{P}{\sigma} = \frac{2(p_1 - p_2)R}{\sigma}$$

That is, the total wall thickness of the nonconnected wall configuration is greater than that for interconnected walls by an amount equal to twice the thickness of the inner cylinder of the nonconnected wall configuration. Correspondingly, the difference in weights of these configurations is equal to twice the weight of the inner cylinder of the nonconnected wall configuration.

Figure 1:
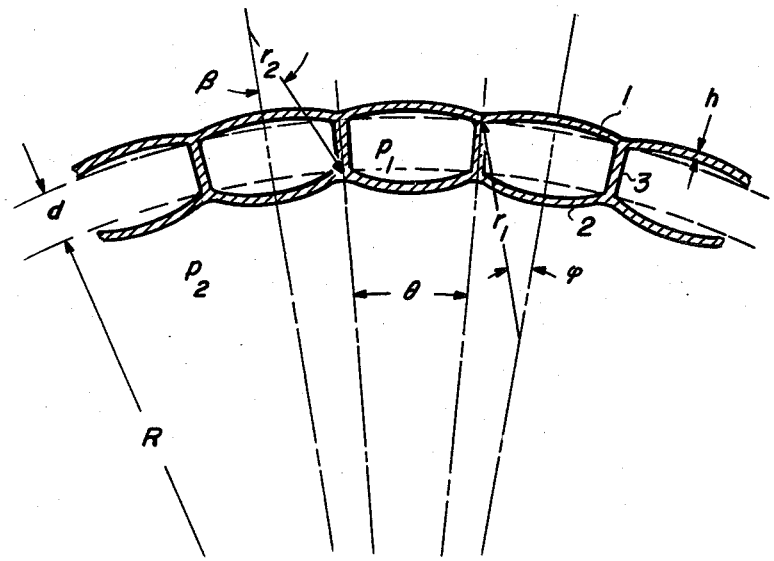
FIGURE 1 is a sectional view of a portion of the double wall interconnected pressure vessel configuration. Nomenclature for the analysis of the double wall interconnected configuration is illustrated in this figure.

The above thicknesses are minimum limiting thicknesses for each configuration as they are based only upon a consideration of membrane forces. For the interconnected wall configuration such factors as bending and thermal stresses could result in greater wall thicknesses. For the nonconnected wall configuration thermal stresses and buckling considerations could mean greater wall thicknesses. For the interconnected wall configuration it will be shown below that the thicknesses of the walls for the cases of interest depend mainly upon membrane considerations. Further the weight of the ribs connecting the walls is less than twice the weight of the inner shell of the nonconnected configuration, from only membrane stress considerations. This difference is magnified when buckling of the inner shell is considered. Therefore, an interconnected wall configuration affords the minimum weight design for the situation of interest. It is interesting to note that for the case where $p_2 > p_1$ it can be shown that there is no weight advantage in the interconnected wall configuration. It will now be shown that for $$p_1/p_2 = \text{constant}$$

and neglecting thermal effects, a 2-wall interconnected configuration as in FIGURE 1 exists with no bending stresses. The only stresses are membrane stresses and stresses due to stress concentrations locally at the rib-shell junctures.

Consider the inner and outer shells acting separately, the inner shell with the ribs. The inner shell is subjected to a pressure $p_1-p_2$ and the outer shell to a pressure $p_1$. If there are no bending stresses, membrane forces in the shells must react these pressures. The membrane force in the outer shell is $P_1=p_1 r_1$ and for the inner shell, $P_2=(p_1-p_2)r_2$.

From FIGURE 1 it can be seen that $$P_1{}^c+P_2{}^c=p_2R+p_1d \tag{1}$$

where $P_1{}^c$ and $P_2{}^c$ are the components of $P_1$ and $P_2$ which are perpendicular to the rib (and therefore to the pressure vessel radius through the rib). FIGURE 1 also shows that $$P_1{}^c=P_1\cos\left(\phi-\frac{\theta}{2}\right), \; P_2{}^c=P_2\cos\left(\beta+\frac{\theta}{2}\right)$$

From above, $$P_1=p_1r_1, \; P_2=(p_1-p_2)r_2$$

so Equation #1 can then be written as, $$p_1r_1\cos\left(\phi-\frac{\theta}{2}\right)+(p_1-p_2)r_2\cos\left(\beta+\frac{\theta}{2}\right)=p_2R+p_1d \tag{2}$$

The condition that the radial components of $P_1$ and $P_2$ at the juncture of each shell 1, 2 with the ribs 3 must be equal may be met if the above Equation #2 is satisfied. By adjusting $r_1$ and $r_2$ in accordance wth Equation 2 and adjusting shell and rib thicknesses based on membrane forces the deformation of the outer wall 1 will equal the sum of the deformations of the inner shell 2 and ribs. The resulting interconnected wall configuration will then deform without bending, the force in the ribs having the value as required by the above equation.

Considering the shells acting separately, the outer shell deformation is proportional to $p_1$, the inner shell deformation to $(p_1-p_2)$. For $p_1/p_2=$constant, $(p_1-p_2)$ is proportional to $p_1$ and consequently all deformations are proportional to $p_1$. Thus the above discussion concerning no bending of the cylindrical shells holds for various values of $p_1$ as long as $p_1/p_2$ is a constant. Obviously when starting the system contained within the pressure vessel $p_1/p_2$ is not constant, but $p_1$ is not the maximum. Maximum operating condition is the most severe condition and therefore design conditions will not be exceeded at startup. Even where $p_1/p_2$ is not a constant, bending stresses are relatively small.

One solution for the no bending configuration is that $r_1$ and $r_2$ be adjusted so that $P_1$ equals $P_2$. In this case the resulting inner and outer shell thicknesses for no bending are very nearly equal and thus the membrane stresses in each shell are very nearly equal. For maximum working pressures of $p_1=1500$ p.s.i. and $p_2=1450$ p.s.i. and for shell dimensions of $R=36.5$ inches and $d=0.40$ inch the maximum operating total load in the shells is $P_1+P_2=53,500$ pounds per inch. Total shell thickness, load (allowable load) in the shells based on yield strength and equal inner and outer shell thicknesses, and the ratio of allowable load to maximum operating load are set forth in Table I for each of three materials. These three materials have been selected as the most promising materials from a minimum weight consideration.

*Table I*

| Material | Total shell thickness, in. | Allowable load, lb/in. | Allowable load (Maximum operating load) |
|---|---|---|---|
| 7075-T6 Aluminum | 0.78 | 61,500 | 1.15 |
| 6A1-4V Titanium | 0.43 | 56,700 | 1.06 |
| 4340 Steel | 0.26 | 61,500 | 1.15 |

The thermal stress in a shell of thickness, $h$, from constant heat generation per unit volume, cooled on one side, is approximately that in an infinite flat plate of twice the thickness cooled on both sides. Then the maximum thermal stress with a surface heat flux of $\phi$, is $$\sigma=\frac{\alpha E\phi h}{3k(1-\mu)}$$

where:
$\alpha E$=thermal expansion coefficient×elastic modulus
$\mu$=Poisson's ratio
$k$=thermal conductivity For heat generation of $Q=0.020$ mw./lb., and material weight per unit volume of $\rho$, the surface heat flux is $$\phi=950\; Qh\rho=19\rho h \text{ B.t.u./in.}^2 \text{ sec.}$$

The resulting maximum thermal stresses for equal inner and outer shell thicknesses are tabulated below in Table II.

*Table II*

| Material | h, in. | k, B.t.u./in. sec. °F. | $\rho$, lb. in.³ | $\alpha E$, p.s.i./° F. | $\mu$ | Stress, p.s.i. |
|---|---|---|---|---|---|---|
| 7075-T6 Aluminum | 0.39 | 1.25×10⁻³ | 0.101 | 111 | 0.3 | 12,300 |
| 6A1-4V Titanium | 0.215 | 0.10×10⁻³ | 0.16 | 72 | 0.3 | 48,000 |
| 4340 Steel | 0.13 | 0.20×10⁻³ | 0.283 | 180 | 0.3 | 39,000 |

A weight summary for cylindrical shells of length equal to 72 inches and with ribs 0.125 inch thick spaced every 2 degrees is shown below in Table III.

*Table III*

Material:                        Total weight, lb.
    7075-T6 Aluminum _____ 1390
    6A1-4V Titanium _____ 1260
    4340 Steel _____ 1410

From the above, it is seen that the unique shape of the present design provides a pressure vessel in which thermal stresses are relatively small, and the highly desirable elimination of bending stresses is obtained. Since the vessel can deform without bending, the vessel is one of minimum weight or, expressed in another manner, is a vessel of minimum pressure stresses for a given total wall thickness.

Equation 2, set forth above, may be rearranged to give a more easily used design equation. Since $$\cos\left(\varphi-\frac{\theta}{2}\right)=\cos\varphi\cos\frac{\theta}{2}+\sin\varphi\sin\frac{\theta}{2}$$

$$\cos\left(\beta+\frac{\theta}{2}\right)=\cos\beta\cos\frac{\theta}{2}-\sin\beta\sin\frac{\theta}{2}$$

then Equation #2 can be written $$p_1r_1\left[\cos\varphi\cos\frac{\theta}{2}+\sin\varphi\sin\frac{\theta}{2}\right]+$$
$$(p_1-p_2)r_2\left[\cos\beta\cos\frac{\theta}{2}-\sin\beta\sin\frac{\theta}{2}\right]=p_2R+p_1d \tag{3}$$

The trigonometric functions involving $\varphi$ and $\beta$ can be written in terms of $r_1$, $r_2$, $\theta$, R and $d$. From FIGURE 1, it can be seen that $$\sin \varphi = \frac{R+d}{r_1} \sin \frac{\theta}{2}, \quad \cos \varphi = \sqrt{1 - \frac{(R+d)^2}{r_1^2} \sin^2 \frac{\theta}{2}}$$

$$\sin \beta = \frac{R}{r_2} \sin \frac{\theta}{2}, \quad \cos \beta = \sqrt{1 - \frac{R^2}{r_2^2} \sin^2 \frac{\theta}{2}}$$

Substituting these expressions into Equation #3 and rearranging, a design equation in final form is obtained.

$$p_1 r_1 \left[ \sqrt{1 - \frac{(R+d)^2}{r_1^2} \sin^2 \frac{\theta}{2}} - \frac{(R+d)}{r_1} \cos \frac{\theta}{2} \right] +$$
$$(p_1 - p_2) r_2 \left[ \sqrt{1 - \frac{R^2}{r_2^2} \sin^2 \frac{\theta}{2}} + \frac{R}{r_2} \cos \frac{\theta}{2} \right] = 0 \quad (4)$$

When designing a pressure vessel for a particular system $p_1$, $p_2$, $\theta$, R, $d$ and one of the radii are fixed. The other radius may be calculated from Equation #4. The wall and rib thicknesses are, obviously, adjusted on the basis of the membrane forces.

Figure 2:
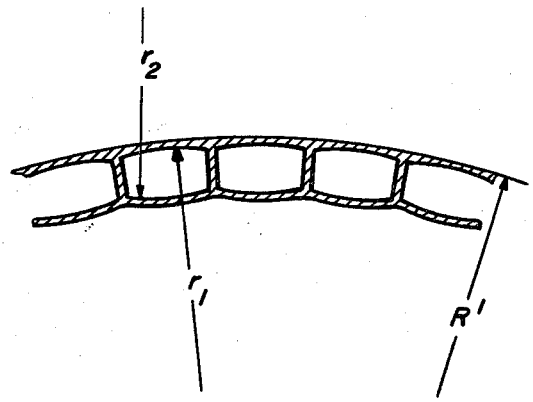
FIGURE 2 is a sectional view of a pressure vessel design which has been modified in the interests of ease of fabrication.

The pressure vessel design discussed above can be approximated by the design of FIGURE 2. The outer shell is a cylindrical surface of radius R' with a scalloped surface on the inside. The inner shell is as before and the radii, $r_1$ and $r_2$, are related to each other by Equation #4.

What is claimed is:

1. A cylindrical vessel of the type requiring a double wall for internal cooling, in which the expected pressure $p_1$ between said walls is greater than the expected pressure $p_2$ within such vessel and the ratio of such pressures is relatively constant, comprising an inner wall, an outer wall, and a multiplicity of radial struts connecting said inner wall and said outer wall at uniform intervals to define a multiplicity of longitudinal coolant channels of identical cross section, said outer wall consisting of a multiplicity of annular segments of radius $r_1$ equal to the number of said struts, each of said annular segments being joined at its ends to adjacent segments and extending symmetrically between said struts with its concave surface facing inwardly, said inner wall consisting of a like number of annular segments each of radius $r_2$ and similarly joined to adjacent segments of said inner wall and extending symmetrically between said struts, each said inner wall segment being disposed with its concave wall facing outwardly, said elements being related according to the relationship.

$$p_1 r_1 \left[ \sqrt{1 - \left(\frac{R+d}{r_1}\right)^2 \sin^2 \frac{\theta}{2}} - \frac{R+d}{r_1} \cos \frac{\theta}{2} \right] +$$
$$(p_1 - p_2) r_2 \left[ \sqrt{1 - \frac{R_2}{r_2^2} \sin^2 \frac{\theta}{2}} + \frac{R}{r_2} \cos \frac{\theta}{2} \right] = 0$$

where $\theta$=the angle between adjacent struts, $d$=the radial length of said struts, and R equals the radius of the pressure vessel to the inner end of the struts.

2. A pressure vessel comprising the combination of two walls, said two walls forming the inner and outer shells of the pressure vessel, said walls joined at regular intervals by rib means, the outer and inner walls forming outer and inner annular segments between the ribs, the ribs and annular segments forming longitudinal coolant channels, the concave surface of the outer annuar segments facing inwardly, and the concave surfaces of the inner annular surfaces facing outwardly wherein the elements $p_1$, $p_2$, $\theta$, R, $d$, $r_1$ and $r_2$ are related according to the relationship:

$$p_1 r_1 \left[ \sqrt{1 - \frac{(R+d)^2}{r_1^2} \sin^2 \frac{\theta}{2}} - \frac{(R+d)}{r_1} \cos \frac{\theta}{2} \right] +$$
$$(p_1 - p_2) r_2 \left[ \sqrt{1 - \frac{R^2}{r_2^2} \sin^2 \frac{\theta}{2}} + \frac{R}{r_2} \cos \frac{\theta}{2} \right] = 0$$

where $p_1$ and $p_2$ are the expected pressures in the longitudinal channels and within the inner wall respectively, $\theta$=angle between adjacent ribs, R=radius of the pressure vessel at the inner wall, $d$=radial length of the ribs and $r_1$ and $r_2$ are the radii of curvature of the outer and inner annular segments respectively.

References Cited by the Examiner

UNITED STATES PATENTS

| | | | |
|---|---|---|---|
| 797,314 | 8/05 | Owens | 220—13 X |
| 1,186,572 | 6/16 | Guibert. | |
| 1,765,947 | 6/30 | Shea | 220—13 |
| 2,151,856 | 3/39 | Lee | 220—13 |
| 2,393,964 | 2/46 | Boordman | 220—10 |
| 2,731,334 | 1/56 | Wissmiller et al. | |
| 2,773,459 | 12/56 | Sechy. | |
| 2,844,271 | 7/58 | Shelton | 220—10 X |

FOREIGN PATENTS

| | | |
|---|---|---|
| 484,953 | 5/30 | Great Britain. |
| 854,946 | 11/60 | Great Britain. |
| 880,092 | 10/61 | Great Britain. |

REUBEN EPSTEIN, *Acting Primary Examiner.*

CARL D. QUARFORTH, *Examiner.*